United States Patent [19]

Cunningham et al.

[11] Patent Number: 5,182,706
[45] Date of Patent: Jan. 26, 1993

[54] BUFFER STATION FOR DOCUMENT PROCESSING AND BALANCING FACILITATION

[75] Inventors: Brian Cunningham, Clarksville; Frank Hanou, Silver Spring, both of Md.

[73] Assignee: Computer Entry Systems Corporation, Silver Spring, Md.

[21] Appl. No.: 445,162

[22] Filed: Dec. 6, 1989

Related U.S. Application Data

[63] Continuation of Ser. No. 361,765, May 30, 1989, abandoned, which is a continuation of Ser. No. 74,035, Jul. 16, 1987, abandoned.

[51] Int. Cl.[5] .................................... G06F 15/30
[52] U.S. Cl. .................................. 364/406; 235/379; 271/3
[58] Field of Search .............. 364/406, 408; 235/379, 235/475, 476, 481, 449; 271/3, 3.1

[56] References Cited

U.S. PATENT DOCUMENTS

| | | | |
|---|---|---|---|
| 4,082,945 | 4/1978 | van de Goor et al. | 235/419 |
| 4,126,779 | 11/1978 | Jowers et al. | 364/406 |
| 4,264,808 | 4/1981 | Owens et al. | 364/406 |
| 4,417,136 | 11/1983 | Rushby et al. | 235/376 |
| 4,555,617 | 11/1985 | Brooks et al. | 235/379 |
| 4,786,786 | 11/1988 | Tanna | 235/379 |
| 4,956,782 | 9/1990 | Freeman et al. | 364/413.03 |

*Primary Examiner*—Roy N. Envall
*Assistant Examiner*—David Huntley

[57] ABSTRACT

A paper document transport system utilizes detected information which is displayed to an operator to determine the balance between a batch of documents and a predetermined sum. Prior to encoding or further processing these documents, they are held in a mechanical buffer until a balance has been achieved and are subsequently fed out from the mechanical buffer to be further processed.

12 Claims, 2 Drawing Sheets

BUFFER STATION FOR DOCUMENT PROCESSING AND BALANCING FACILITATION

This application is a continuation of application Ser. No. 07/361,765 filed May 30, 1989, now abandoned, which is a continuation of application Ser. No. 07/074,035 filed Jul. 16, 1987, now abandoned.

BACKGROUND OF THE INVENTION

1. Field of the Invention

The present invention is addressed to the area of paper document transporting including remittance processing, wherein documents are read either electrically or optically and/or subsequently checked by an operator and finally encoded.

2. Discussion of Background

Document processing involves the processing of remittance documents which may involve a bill and a check in a typical transaction. A customer receives a bill in the mail and returns a portion of that bill with a check. The processing of this returned bill and the returned check involve several steps beginning with the opening of the envelope at the document processing center.

The bill which is sent to the customer and which is subsequently returned by the customer to the document processing center, usually contains a line to be filled in by the customer indicating the amount of payment. The bill also contains the required/minimum payment indication and the total due to pay off the account. These indications of required payment and total amounts due are encoded in the bill usually in a form which can be read by an optical character reader (OCR) and/or a magnetic reader (MICR, Magnetic Ink Character Reader). As a part of normal document processing either one or both of these indications are read by the appropriate machines along the system path after the envelope is opened and the documents are removed from the envelope and inserted into a hand or automatic feeder. Once the feeding operation and the subsequent reading operation have begun, the bill is read by the machine and fed to a view station where an operator may visually confirm the relationship between the written amount of payment on the bill and the amount of the check accompanying the bill or perform any other corrections required. While the bill is being fed and read by the machine, the operator inspects the check visually and keys the amount from the check. The microcomputer controlling the machine compares the keyed amount from the check with the data read from the bill and makes the decision to accept the check or not. If the check is drawn for an acceptable amount, then it is encoded and passed on through the system. The bill likewise is released from the view station and passed through the system. If the check is unacceptable either through being in an unacceptable amount, unsigned or otherwise not acceptable or questionable, or if the bill is unreadable or otherwise unacceptable then the bill remains in the view station and the operator attempts to reconcile the transaction. If the reconcilliation is successful, the transaction is processed normally, as above, if not, the (bill and check) are sorted to an exception pocket or pockets.

Any number of odd situations, including the payment by means of two or more checks which require further analysis by the operator, may hold up the entire system and makes the continuous operation difficult or impossible.

Another difficult area of document processing is a transaction having a plurality of checks accompanying a deposit document. This type of system is of course used in document processing for banking systems. In many instances a transaction may consist of a deposit document as well as several checks. In the instance of depositing from a large account, as in a business deposit, the document may be accompanied by a large number of checks. In the present document processing systems the deposit document would be read and compared with a sum obtained from each of the deposited checks. This operation is usually performed on what is known as a proof machine and the actual operation involves an operator inspecting each check in the batch, indexing the dollar amount of the check into the proof machine keyboard and then dropping the check into the document transport mechanism where it is encoded with the indexed amount and the backside of the check is endorsed with audit-trail information. In the meantime the proof machine also accumulates a sum of the dollar amounts of each check and prints this sum at completion of the operation.

It can be easily seen that if there are problems with any of the checks or if there is an improper addition, the entire batching process must be stopped and furthermore the previous checks have already been encoded so that it is difficult to regain the entire batch for special processing.

The remittance processing operation can be operated in either the stop and go mode or in the streaming mode. The operator visually confirms the relationship between the written amount of payment on the bill and the amount of the check and the keying from the check triggers the machine to accept the check. In the prior art systems, speed was either sacrificed initially so that each item needed to be passed through in sequence upon the control of the operator in a stop and go mode or a continuous stream was fed at a predetermined time interval which saved time but caused serious problems when unusual circumstances required the operator to take steps requiring examination or further action on one of the particular items which required a complete stoppage of the feeding process.

Another important and recent development in the document processing system is the capturing of the image of the documents prior to operator intervention so that the operator views not the document but an image of the document. The advantages of this type of system are of course the ability to manipulate the documents once the images have been captured so that there is an increased ease in the viewing of the documents. The drawback to the imaging system is the separation of the document from the image of the document so that when an operator views an image of the document and there is a mistake or action needs to be taken, the document is difficult to find or has already passed down the stream of processing.

SUMMARY

Accordingly, one object of the present invention is to provide a novel system which operates in a remittance processing environment to allow for an operator to inspect all of the elements of a transaction before any of the elements of the transaction are processed.

It is a further object of the present invention to provide a check-proofing coding operation wherein the whole batch of checks are fed and balanced before any of the checks are encoded.

Another object of the present invention is to provide a system which utilizes document imaging in which it is possible to prefeed enough documents which have been imaged so that there is always an image readily available to the operator for inspection.

It is a further object of the present invention to provide a mechanical buffer operation which provides ready access of the operator to all of the elements of a transaction.

It is further object of the invention to provide a mechanical buffer system whereby documents are collected and retained in the event that there is a need for the operator to stop the processing flow.

The present invention provides a system which allows for the completion of machine reading of each of the documents in a batch regardless of the speed at which each document is visually inspected and regardless of the length of time required for the operator to key required information to assist in the balancing. Only upon completion of the balancing are the documents released under electronic and mechanical control for further processing in the transport system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
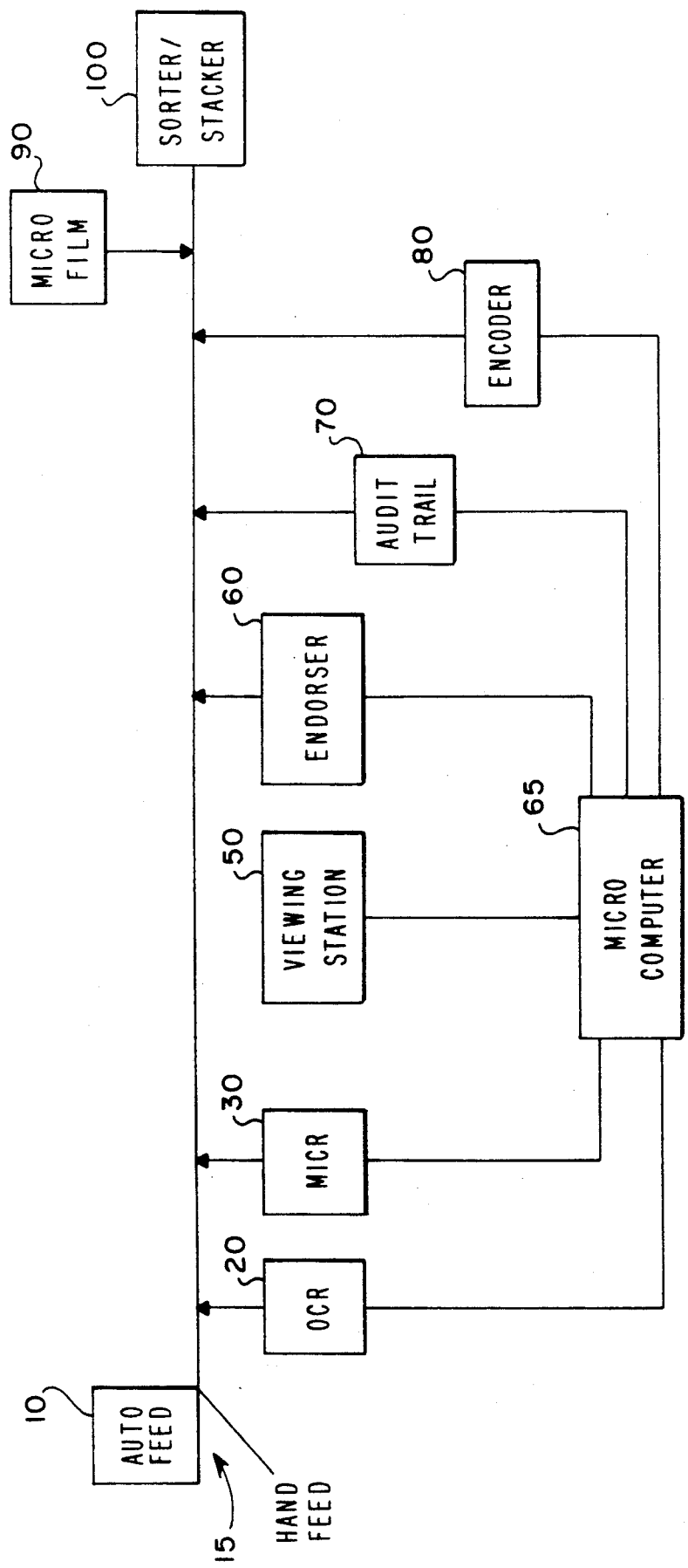
FIG. 1 illustrates a prior art document transport proof machine.

The remittance processing work station of FIG. 1 utilizes an automatic feed 10 or in the alternative a hand feed entry system 15 where documents are fed in order to pass single documents in the direction indicated by the arrow past a optical character reader 20 and a magnetic ink character reader (MICR) 30. The document is then passed to a viewing station 50 where an operator acts on the information in the document and the document is then passed down the track past the endorser 60, the audit trail printer 70 and the encoder 80. The endorser, the audit trail printer and the encoder are selectively utilized depending upon the nature of the document passing down the system. If the document is a check, for example, the check is endorsed and if the document is a part of a labeled transaction, then the audit trail provides a number on that document so that it is identified with a particular transaction. Lastly, if the item is a check it is encoded or if it is any other document which needs to be encoded it is accomplished by the encoder station 80. After leaving the encoder station and any other processing stations which may be utilized, the document is passed to the sorter and stacker 100. Any documents which are viewed at the station 50 having un-corrected difficulties or problems are outsorted to exception pockets.

The control and programming operation by means of a micro-processor for the operation of each of the elements of FIG. 1 can be accomplished in a manner similar to the disclosure of U.S. Pat. No. 4,126,779 to Jowers, with the exception that the FIG. 1 system by means of a single track instead of the two track system of Jowers. That is, the Jowers Patent 779 functions on a two track system because there is a separate automatic feed system for the card reader 28 which would correspond to a transaction document as well as a stacker for the remittance documents which are fed in a check hopper in the encoder 24. The system of FIG. 1 uses a single track system in the sense that there is only one automatic feeder 10 which contains both the bills (transactions documents) and the checks (remittance documents). The microcomputer 65 is programmed for alternate operation in the sense that when a check is fed past the OCR 20 and the MICR 30, no detection takes place whereas when a bill (transaction document) is passed out of the system past the endorser and the encoder, nothing is done to the bill. It is possible that the audit trail 70 or the encoder 80 may be programmed to place information on the transaction document after it has been passed down the system, however, in the simplest conceptual form a transaction document is read by the OCR and the MICR and after confirmation is fed to the sorter with only audit trail information being added. Conversely, a check will be passed down the system without being read by the OCR 20 or the MICR 30 and will be endorsed, stamped with audit trail information and encoded.

The work station remittance processor of the type disclosed by the Jowers 779 Patent as well as the work station remittance processor of FIG. 1 which is available as Model No. TRP700 from CES (Computer Entry Systems), function in either a key mode or a compare mode.

The following scenario illustrates the key mode: If a transaction batch header card is inspected by the central processor unit i.e. by the readers, then the input record includes the transaction batch number and an indication as to multiple transactions being included as a part of the transaction. When an operator keys in a particular batch number the central processor unit then compares the remittance batch number with the batch number from the header card. If the batch numbers match, then the central processor unit causes the appropriate commands for the batch number to be printed on the audit tape. Subsequently, the central processing unit reads the next transaction card which indicates the first transaction of the particular batch. If the remittance information from the keyboard entry does not match the amount read from the transaction document then the encoding process is inhibited while an audible alarm indicates that the operator needs to "Re-Key" into the encoder keyboard. When the key mode of operation is utilized in the system of FIG. 1 then there is no requirement that the transaction documents be sorted according to the single expected payments so that the remittance information can be compared to as many as three fields of transaction document information which can contain for example full payment information, partial payment information and minimum pay information.

The other mode of operation is called the "Compare" mode in which the transaction documents must be sorted by amounts and only the expected payments can be processed in this particular mode. Expected payment amounts are full payments, minimum due payments or passed due payments. In the compare mode the batching verification is the same as in the key mode and the operator visually compares the remittance document amount to the displayed amount read from the transaction document and if they agree then the operator allows the automatic feeder to pass the document into the encoder transport system for the encoding, the endorsing and the audit trail information. The central processor unit transmits the information from the transaction document to the encoder so that in the "compare" mode there is no keyin involved. In other words, the expected amount on the transaction document is read by the card reader and transferred to the central processor unit and the encoder interface to the encoder.

Because of this automatic reading there is no delay in the "compare" mode and when there is a discrepancy in a visual comparison of the remittance document and the transaction document amounts, it is due to an error in sorting the remittance and transaction documents. If such a discrepancy is noted then the mode is switched from the "compare" mode to the "key" mode to enter the amount and to follow the remaining procedure in the "key" mode discussed above. Afterwards the operator will return to the "compare" mode.

Figure 2:
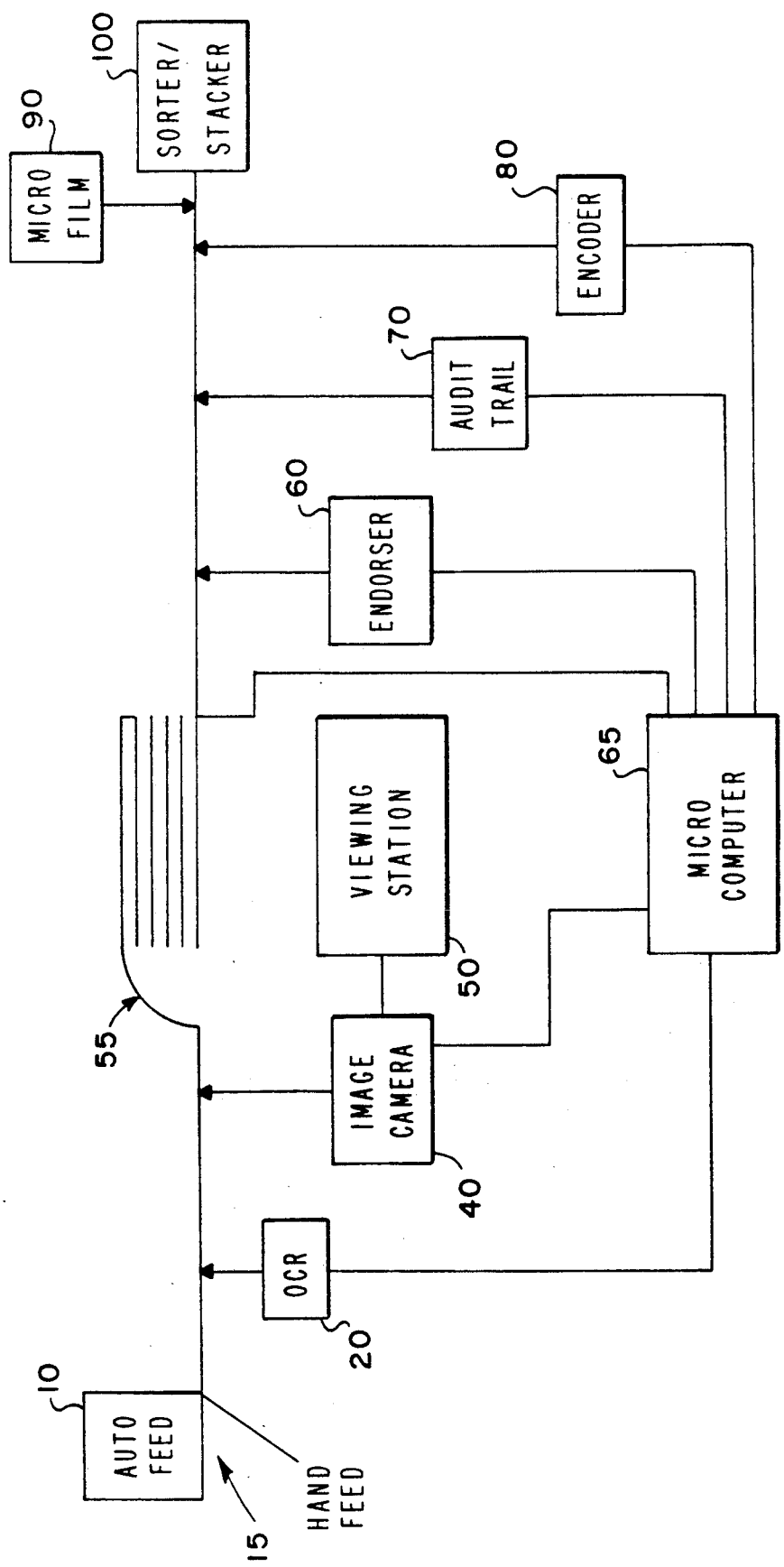
FIG. 2 illustrates the improved document transport system of the present invention utilizing a multiple document mechanical buffer.

The FIG. 2 illustrates the improvement in the remittance processing system which allows for completion of total transactions prior to the encoding operations or prior to further processing. This improvement also provides readily accessible documents to be inspected by the operator when an imaging camera is utilized for purposes of readily comparing a document which has been photographed with the original document.

With the system of the present invention as detailed in FIG. 2 it is possible to provide improvements whereby the operator is able to retain control over each of the documents in a batch at any time prior to the completion and the balancing of that batch. With the system of FIG. 2 there is no encoding until an entire batch transaction is completed and furthermore any document in a particular batch which needs to be visually inspected is available prior to the completion of that batch or that transaction.

The systems of the prior art including that shown in FIG. 1 are such that if the operator "needs" to stop and inspect a particular document the system must stop in the sense that the feeding of the documents must stop which slows up the entire operation.

The FIG. 2 system is such that numbers which are identical to FIG. 1 describe systems which are themselves identical and the utilization of the image camera 40 shown in FIG. 2 in conjunction with the viewing station 50 is a feature which particularly allows for a significant improvement due to the system of FIG. 2.

When an image camera takes a picture of the document and when an operator views that "image" at the station 50, the image being viewed may be two or more documents at the same time in order to provide for the visual comparison or to facilitate rapid visual verification.

In either event, the present invention which utilizes the mechanical buffer station 55 provides a collection point for keeping all of the documents in a particular transaction or batch until that transaction has been completely processed. This is critical to the present improvement in the sense that if, for example, a transaction includes a deposit slip and 50 checks, the entire balancing of the 50 checks against the deposit slip may be accomplished before any of the documents are endorsed and otherwise encoded. This not only provides for a "clean" total transaction but also provides for accessibility to all of the documents or any one of the documents should there be a problem with respect to the image which an image camera produces. In other words, if the image is unable to be read or if there is some doubt as to the quality of the particular image, the operator may inspect the document which is contained within the buffer.

Even if a image camera 40 is not used when a transaction involves many elements, it is very convenient for all of these elements to be "contained" until the entire transaction is processed.

When a remittance processing system is used which contains odd payments i.e., there are two checks to cover the balance or the balance is not entirely covered by the checks, this can be easily ascertained because the buffer 55 will contain the documents until the entire transaction is completed. Thus, if there are five checks which need to add up to the remittance document amount they can each be retained until it is verified.

The microcomputer 65 is easily programmable to control the release of the documents from the mechanical buffer 55 in a manner similar to the beginning of a encoding step in the system of FIG. 1. The mechanical buffer 55 functions to collect a plurality of documents and retain them in an effective "pocket" until a particular transaction has been completed at which time all of the documents are fed out singly to be encoded or otherwise processed depending upon whether a particular document is a transaction or remittance document. Thus it can be seen that the utilization of the system of FIG. 2 provides an improvement in the work station remittance processor whether it be operated in the key or the compare mode because the information displayed to the operator enables the operator to determine that a balance has been achieved between a batch of documents which are either key entered or read under the OCR and a pre-determined sum acquired from another source. The operator may or may not be required to key certain information to assist in the balancing depending upon whether the system is operating in the "key" mode or the "compare" mode. During the process a part or all of the balancing is stored in a memory of the microcomputer and the documents which are being examined are held in the mechanical buffer 55 while a balance is being obtained. Upon completion of this balancing, the documents are released from the buffer under the control of the microcomputer for further possible processing e.g. encoding and for stacking.

If the key operation is being performed by the operator then despite the fact that each document is keyed in with the appropriate encoding item, the microcomputer stores these items until the total transaction has been completed. Thus although the operator will have keyed in amounts for each of the checks which are to be encoded, the actual operation of encoding those checks will not occur until the transaction has been completed and the documents are released from the buffer 55. The software control to accomplish this step is well known in the art.

Any one of a number of mechanical buffers which function to contain a plurality of documents and which dispense those documents in an efficient manner would function to serve as the mechanical buffer 55. A particular buffer is able to retain up to 300 documents and functions to dispense those documents one at a time after the transaction has been balanced so that the documents are fed into the buffer in a continuous manner and once the transaction has been completed, the documents are fed out of the buffer for further processing in a continuous manner. Of course, as discussed above, during the time that such documents are being held, they are available for inspection and the entire transaction will not be processed until it is a completed and balanced transaction. Any mechanical buffer of the type which can successively retain a plurality of documents which are fed one at a time and which can release those documents one at a time, upon command, and in order satisfies the requirement for the mechanical buffer 55.

Obviously, numerous modifications and variations of the present invention such as the utilization of different types of mechanical buffers and the use of a magnetic ink character reader are possible in light of the above teachings. It is therefore to be understood that within the scope of the appended claims, the invention may be practiced otherwise than as specifically described herein.

What is claimed as new and desired to be secured by Letters Patent of the United States is:

1. An improved single station paper document transport system for verifying a balancing between the amount obtained from at least one remittance document associated with a transaction document and a transaction amount obtained from said transaction document, comprising:
    means for feeding said transaction document and each of said at least one remittance document one at a time through a transport means;
    means for detecting data contained on at least said transaction document wherein said data is in the form of at least one of optically and magnetically recognizable characters;
    means for storing said detecting data as said transaction amount;
    operator control means for inputting data indicating the amount of each of said at least one remittance document;
    means for indicating the achievement of a balance between said transaction amount and the total of said input data indicating the amount of each of said at least one remittance document;
    means for storing in succession said transaction document and each of said at least one remittance document fed one at a time through said transport means;
    means for releasing, one at a time all of said transaction and remittance documents from said document storage means in response to an output of said means for indicating a balance;
    means for processing said documents released from said document storage means wherein said processing means includes means for encoding each of said at least one remittance document with an amount equal to said amount from said each remittance document whereby said documents in said document storage means are not released from said document storage means and are not processed until all of said remittance and transaction documents have been stored in said document storage means and until after a balance has been obtained between said total of said input data and said transaction amount detected from said transaction document.

2. The single station paper document transport system according to claim 1 wherein said means for storing in succession said transaction document and each of said at least one remittance document is a mechanical buffer.

3. The system according to claim 1 wherein said transaction document is a deposit slip and wherein said at least one remittance document is a check.

4. The system according to claim 1 wherein said transaction document is a bill.

5. The system according to claim 1 further comprising an image means for capturing an image of each of said transaction document and said at least one remittance document and a display means for displaying said images; and
    means for controlling the display of said images on said display means.

6. The system according to claim 1 wherein said means for detecting data contained on at least said transaction document includes means for detecting data on said at least one remittance document.

7. The system according to claim 1 wherein said means for processing said documents includes a means for encoding said transaction document.

8. A method for verifying the balancing of a transaction by balancing the transaction amount obtained from transaction document with the amounts obtained from at least one remittance document associated with said transaction document, comprising the steps of:
    feeding said transaction document and each of said at least one remittance document one at a time through a transport system;
    detecting data contained on at least said transaction document by at least one of optical and magnetic detection of characters;
    storing said detected data as said transaction amount;
    inputting data indicating the amount of each of said at least one remittance document;
    detecting the achievement of a balance between said transaction amount and the total of said input data indicating the amount of each of said at least one remittance document;
    storing, in a document storage means, in succession, said transaction document and each of said at least one remittance document which has been fed one at a time in said transport system;
    releasing, one at a time, all of said transaction and remittance documents from said document storage means in response to the step of detecting the achievement of a balance between said transaction amount and said total of said input data;
    processing said documents which have been released including the step of encoding each of said at least one remittance document with an amount equal to said amount from a corresponding said each remittance document whereby said step of releasing said documents is inhibited and said step of processing said documents is inhibited until all of said remittance documents and said transaction document have been stored in said document storage means and until after a balance has been obtained between said total of said input data and said transaction amount detected from said transaction document.

9. The method according to claim 8 wherein said step of inputting data indicating the amount of each of said at least one remittance document is controlled by an operator.

10. The method according to claim 8 further comprising the step of obtaining an image of each of said remittance and transaction documents and controllably displaying said images prior to the step of inputting data indicating the amount of each of said at least one remittance document.

11. The method according to claim 8 wherein said step of detecting data contained on at least said transaction document further includes the step of detecting data contained on said at least one remittance document.

12. The process according to claim 8 wherein said step of processing said documents released from said document "storage" means includes the step of encoding said transaction document.

* * * * *